(No Model.) 3 Sheets—Sheet 1.
W. J. GREENE.
AUTOMATIC CUT-OUT FOR ELECTRICAL CONVERTERS.
No. 598,922. Patented Feb. 15, 1898.
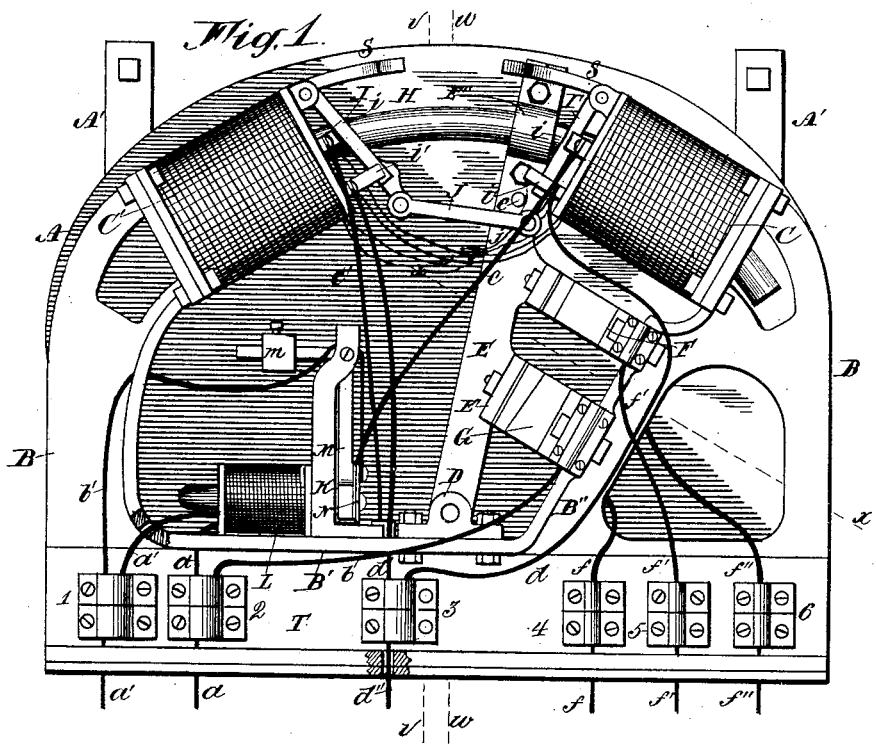
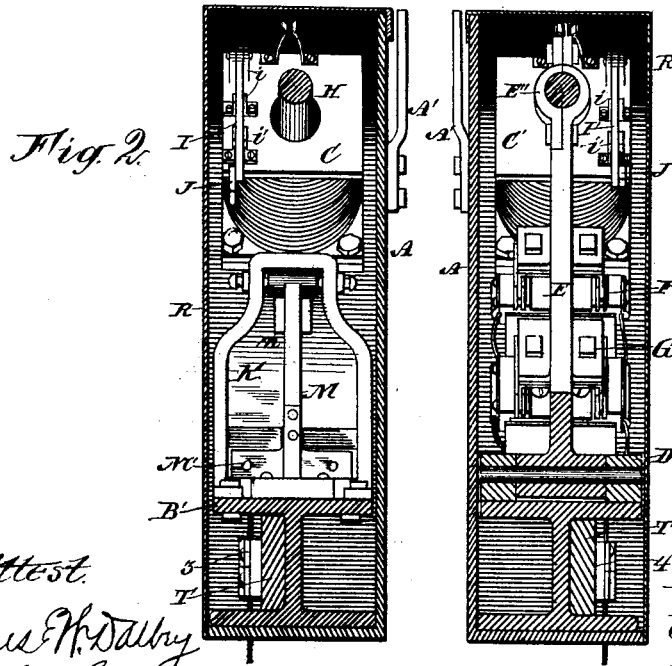
Attest.
James W. Dalby
Inventor.
William J. Greene
By J. M. St. John
Atty.

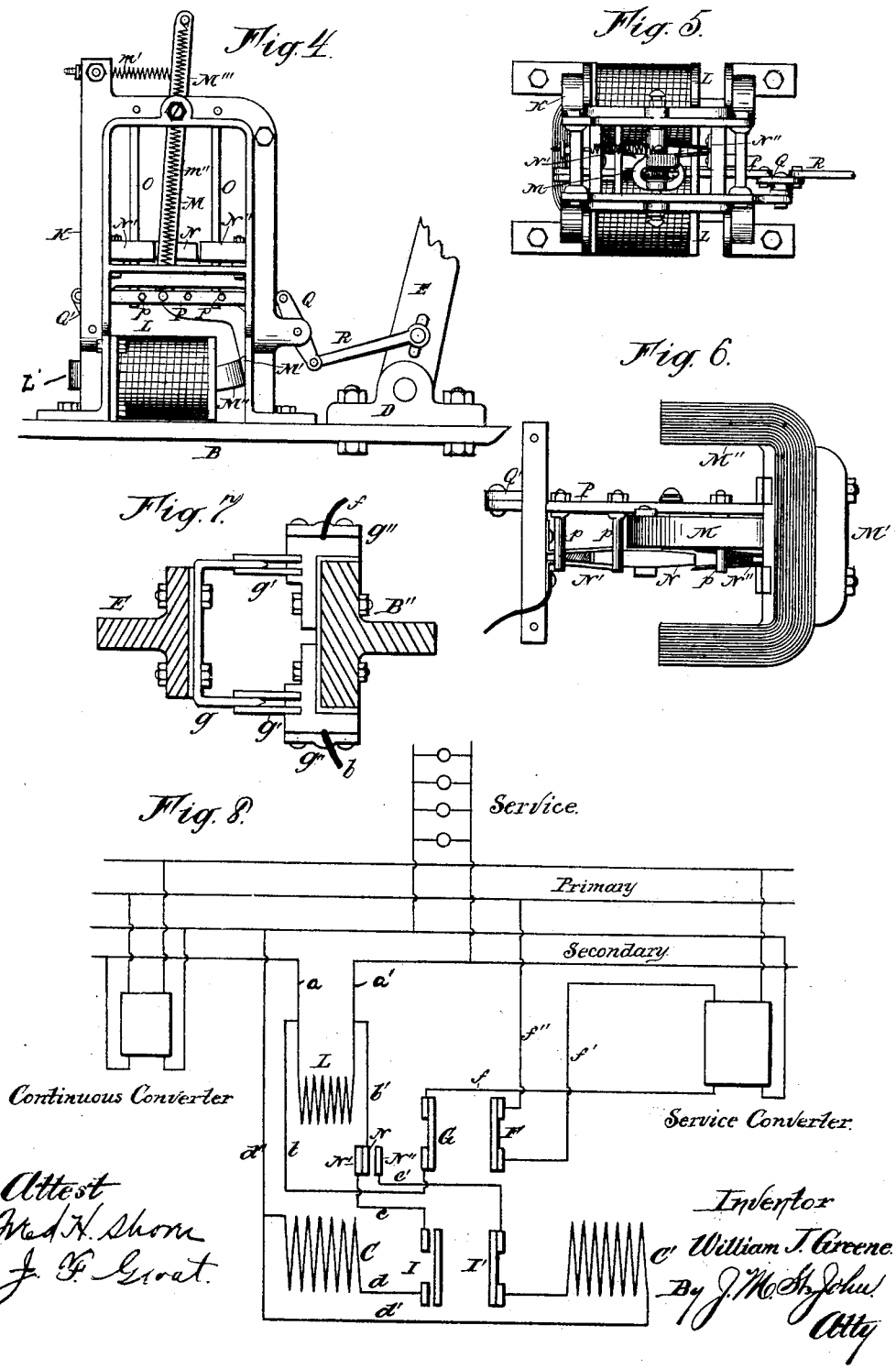

(No Model.) 3 Sheets—Sheet 3.

W. J. GREENE.
AUTOMATIC CUT-OUT FOR ELECTRICAL CONVERTERS.

No. 598,922. Patented Feb. 15, 1898.

Attest
James W. Dalby
J. F. Groat

Inventor
William J. Greene
By J. McSt. John
Atty.

UNITED STATES PATENT OFFICE.

WILLIAM J. GREENE, OF CEDAR RAPIDS, IOWA.

AUTOMATIC CUT-OUT FOR ELECTRICAL CONVERTERS.

SPECIFICATION forming part of Letters Patent No. 598,922, dated February 15, 1898.

Application filed January 13, 1896. Renewed May 21, 1897. Serial No. 637,624. (No model.)

*To all whom it may concern:*

Be it known that I, WILLIAM J. GREENE, a citizen of the United States, residing at Cedar Rapids, in the county of Linn and State of Iowa, have invented certain new and useful Improvements in Automatic Cut-Outs for Electrical Converters; and I do hereby declare the following to be a full, clear, and exact description of the invention, such as will enable others skilled in the art to which it appertains to make and use the same.

The object of this invention is to produce a simple, compact, durable, and efficient apparatus for automatically cutting in and out electrical converters.

A device embodying the invention will be fully hereinafter described and claimed, reference being had to the accompanying drawings, in which—

Figure 9:
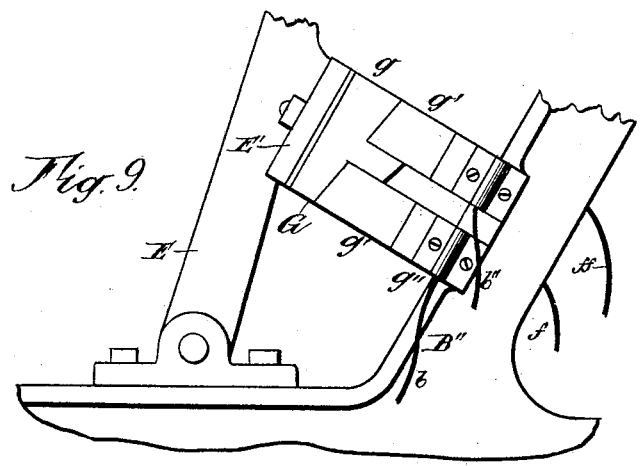
Figure 10:
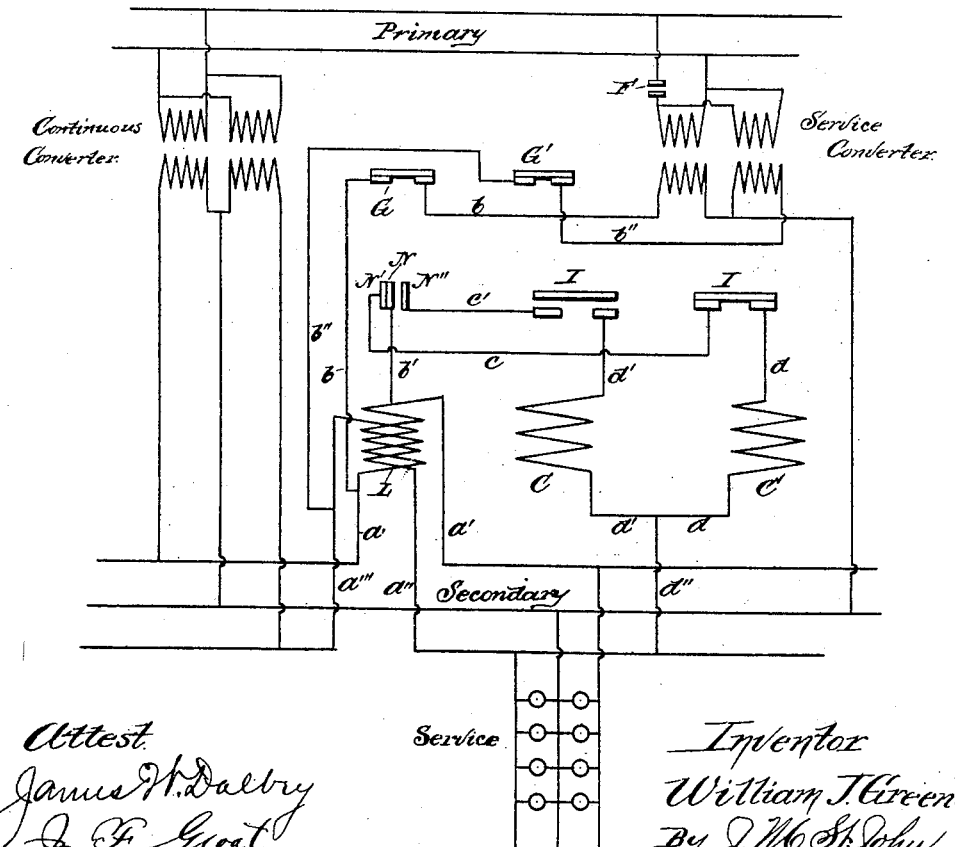

Figure 1 is a front elevation of such a device, the protecting-case being removed. Fig. 2 is a vertical section of the same at the left of line $v\,v$, Fig. 1. Fig. 3 is a similar view at the right of line $w\,w$. Fig. 4, Sheet 2, is a front elevation of the preferred form of controller. Fig. 5 is a plan view of the same. Fig. 6 is a view from the under side of the armature, switch, and shifting mechanism of such controller. Fig. 7 is a fragmentary sectional view of one of the main switches below the line $x\,x$, Fig. 1. Fig. 8 is an ideal diagram illustrating the electrical connection of the various parts. Fig. 9, Sheet 3, is a fragmentary front elevation illustrating one of the switches as adapted for a three-wire circuit. Fig. 10 is a diagram illustrating the electrical connections when the apparatus is applied to a three-wire system.

The apparatus is designed to be set upon a post or wall at suitable localities and connected up with primary and secondary circuits of electrical converters, as will hereinafter more fully appear, and to automatically cut in a service-converter by the mere closing of a service-circuit, as by the turning on of a lamp, and by the contrary action, such as the turning off of the last lamp in such converter district, cut out the converter, thus avoiding the leakage incident to the charging of such converters and the maintenance thereof.

Referring now to the drawings, A designates a bracket, preferably curved at the top and adapted to receive a hood or casing R to protect the apparatus from the elements and to be attached to a wall or post, as by offset arms A' A'. On the horizontal bottom of this bracket is mounted the frame B. This has upwardly-extending standards, terminating in suitable flanges, to which are secured solenoids C and C'. On a flanged portion of the frame, some distance from the base, suitable bearings D D are attached, and between these is pivoted an upwardly-extending arm E. The upper end of this arm is provided with a suitable box or seat E''', and in this is secured a curved armature H, adapted to play back and forth in the central hole of the solenoids. On one side of the arm are suitable flanges E' E', to which are secured the stirrup-shaped contact-plates $g\,g$ of switches G and F. To inclined flanges B'' of the frame, opposite these contact-plates, are secured double contacts $g'\,g'$ by suitable bases fitted to said flanges. The outer ends of these bases are provided with clamping-plates $g''\,g''$ and serve as binding-posts for the conductors, to be hereinafter more particularly referred to. The switch F may be called the "primary" and the switch G the "secondary," closing the primary and secondary circuits, respectively.

To the outer ends of the solenoids C and C' are connected pivotally switch-arms I and I', coupled at their free ends by a link J. These arms play between double contacts $i$ and $i'$, actuated by the movement of the reciprocating arm E, which is provided with a stud $e$, abutting on the outer face of each arm alternately when near the limit of its movement. It is to be understood that this movement of the arm opens the switch behind it and closes the switch in front in each case. Thus in Fig. 1 the switch I is open and the switch I' is closed.

To prevent any vibration of the arm E when thrown over to either limit of its movement, spring-clamps S S' may be attached to each solenoid, respectively, to engage by spring-tension the upper end of the said arm. The compression of the springs should be comparatively light, so as not to impede the movement of the arm under the influence of the opposite solenoid, but sufficient to counteract any tendency of the arm to rebound or vibrate.

To the base B', at one side of the arm E, is attached a double-acting switch, which may be designated as the "controller," its function being to shift the current from one of the main solenoids to the other for the purpose of cutting the converter in or out, as desired.

A yoke K is suitably secured to the base B'. To one side of this yoke is secured a pair of solenoids L L, which are preferably provided with a laminated "horseshoe" core L', the ends of which project into the solenoids a short distance, according to a common and well-known form of construction. A pendulum arm M is pivoted near the upper end of the yoke or frame K and has lateral arms M' M' at the lower end, to which is attached a suitable horseshoe armature M'', the ends of which project into the solenoids L L, but are free to play back and forth therein as the arm swings on its pivots. A suitably-insulated contact-plate N is attached to the pendulum arm and is adapted to make electrical connection with switch-terminals N' N'' alternately. The contact N connects electrically with a conductor $b'$ and the terminals N' and N'' with conductors $c$ and $c'$, respectively, as will hereinafter more fully appear. Suitable provision is made for moving the arm M away from the solenoids, such as a weight $m$ in the simple form illustrated in Fig. 1 or a spring $m'$ in the improved form shown in Figs. 4, 5, and 6.

The efficiency of the apparatus depends upon the certain action of the controller both in cutting in and cutting out the converter. In view of the fact that the controller must act through the influence of but a small current sometimes (say the current flowing through one, five, or even ten incandescent lamps) much difficuly has been experienced in obtaining switch-contact free from the destructive effect of sparking. The injurious effects may be obviated to a large extent by using carbon terminals with a simple abutting contact, as in Fig. 1; but it is desirable that a firmer contact than this be made by the controller-switches, so as to secure positive action and durability. This is effected by means of mechanism such as that illustrated in Figs. 4, 5, and 6.

Certain fundamental difficulties were involved in this invention which may be briefly referred to.

Owing to the weakness of the current available the pendulum arm could not be drawn forcibly enough to make the desired contact with a suitable spring-switch, even with a comparatively light counteracting spring or weight to draw it back. This of course precluded the attachment of a direct spring strong enough to make the opposite contact in such a form of switch. It became necessary, therefore, to devise means for augmenting the pull of the solenoid L or the counteracting-spring, or both, as soon as the arm M begins to move or shortly thereafter and to relieve the pressure of the switch-contacts, so that the arm might be free to swing back under the influence of a slight magnetic or mechanical pull. These difficulties are entirely overcome by a simple mechanical device, whereby the abundant energy applied in the movement of the main switch-arm may be utilized potentially in the operation of the controller itself.

Referring now to the drawings, it will be seen that the arm M is provided with an upward extension M''', and to a stud near the upper end is attached a long coil-spring $m''$. This spring passes through a slot in an enlargement of the pivotal portion of the arm, as shown in Fig. 5. The lower end of the spring connects with a movable bar P, which is shifted back and forth through suitable mechanism by the main switch-arm E. This may be a simple lever Q, pivoted at a suitable part of the frame K, and a link R, connecting one of its ends with the arm E, the other end connecting with the bar P. The movement of the arm E thus moves the bar P in the opposite direction.

The contact-plate N is preferably attached to the arm M between the solenoids and its pivot and is made slightly wedge-shaped at each end, as shown. The terminals N' and N'' are made divergent to correspond to the shape of the part N and should be somewhat flexible, so as to be sprung outwardly without injury. Between the plates of each terminal passes an arm O, pivoted to the upper part of the yoke and extending some distance below the switch. These lower ends are made to engage with lateral studs $p\ p$ on the bar P. The studs are set some distance apart, so that such engagement is only when the bar is near the end of its stroke. The action of the stud on one side of the arm O is to wedge it nearer the narrower part of the part N' or N'', and thus spread the plates of the terminal apart to relieve the pressure thereof on the contact-plate N. The action of the other stud engaging with the same arm is to reverse this movement and restore the terminal to normal position.

The operation of the whole device above described will be readily understood. In the position shown in Fig. 4 the solenoid L is supposed to be energized, but both switches N' and N'' are open, N' being wedged open. The spring $m''$, drawing, as it does, straight across the pivotal point of the arm M, offers no resistance to the movement of the arm. Let now the current cease flowing through the coil of the solenoid and the counteracting-spring $m'$ starts the arm on the back stroke. The bar P does not move until the arm has completed its movement. Consequently the spring $m''$, which may be as strong as desired, begins to aid the spring $m'$ as soon as the arm M swings back a little and with a continually-increasing leverage until the arm reaches the limit of its stroke. This drives the contact N forcibly between the plates of the terminal N", making a firm electrical connection. This throws the current through the solenoid C', and the position of the arm E is reversed, thus reversing the position of the bar P. In so doing the spring $m''$ is shifted to a position parallel with the arm M again, where its strain is neutral. The position of the wedge-arms O O is correspondingly reversed, restoring N' to normal position and spreading the plates of N". When in such position, a feeble current in the coil of the solenoid L will draw back the armature M", the only mechanical resistance thereto being the slight tension of the spring $m'$ and the slight inertia and friction of the parts. In the case of a switch so constructed the friction of the contacts serves to keep the faces bright and clean, so that a slight sparking at the moment of contact is not injurious.

The electrical connection of the apparatus with the primary and secondary circuits is shown in Fig. 8. Two converters are here illustrated, one of them, designated as the "continuous" converter, being directly in circuit. The other, which may be called the "service-converter," is connected with the apparatus in the following manner: One limb of the primary coil connects directly with one of the primary mains and one limb of the secondary coil with one of the secondary mains. The other limb of the primary $f'$ connects with the other primary main through the switch F and conductor $f''$. The other limb of the secondary $f$ connects with the other secondary main through the switch G and conductor $b$. One of the secondary mains is in series with the coil of the solenoid L through the loop $a\ a'$. A conductor $b'$ leads from this wire of the secondary to the contact-plate N. From the terminal N' a conductor leads to the switch I, and from the terminal N" another conductor leads to the switch I'. From these switches conductors $d\ d'$ carry the current through the coils of the solenoids C and C', respectively, to the other secondary main, thus making an auxiliary circuit through each solenoid alternately, according to the position of the contact N. The positions of the parts in Fig. 8 correspond ideally with the positions in Fig. 1, the service-converter being cut in. It is evident that on breaking the secondary circuit, as by the turning out of the last lamp in this converter district, the current will cease to flow in L, whereupon N makes contact with N", the current passes through C', and the arm E is thrown back, cutting out the service-converter. Just before reaching its final position in either direction, however, the arm E reverses the switches I and I' by its own momentum, so that when the service-converter is cut out the switch I is closed, and vice versa.

By a slight modification in construction and wiring the apparatus is adapted to a three-wire system of distribution.

The system itself (illustrated in Fig. 10) is of a common and well-known type, and need not be particularly described. The only change in the construction of the cut-out necessary (provided the controller has a pair of solenoids) is to provide it with another secondary switch. This may be done by providing two pairs of terminals $g'\ g'$ and suitable binding-posts therefor, both switches being closed by the same contact-plate $g$. One of the solenoids is in series with the positive wire and the other with the negative wire of the secondary circuit, being the outer wires in the diagram Fig. 10. These connections are designated by reference-letters $a\ a'$ and $a''\ a'''$, respectively. From one of these loops a conductor $b$ leads to the switch G, and from the other loop a similar conductor leads to the switch G'. These switches close both circuits of the secondary through conductors $b$ and $b''$, the double secondary coil of the service-converter and a common conductor leading to the middle or neutral wire of the secondary mains. The solenoids C and C' connect with one of the active wires of the secondary circuit in the same manner as in the case of the common two-wire circuit.

It will be seen that the turning in or out of lamps on either side of the lamp-circuits will cut the service-converter in or out, as already described.

Provision is made for the quick and easy connection of the apparatus in circuit by means of binding-posts 1, 2, 3, 4, 5, and 6, attached to a suitable insulating-slab T, secured to the vertical web of the frame connecting the bottom flange with the base B'. The internal wires pass into these binding-posts from above, as indicated, suitable holes being made in the frame for them to pass through where necessary. The external wires pass up into them from below through holes in the bracket and frame. The device may thus be easily connected up from the front side by removing the hood R.

Having thus described my invention, I claim—

1. In a cut-out for electrical converters, the combination with a suitable supporting-frame, of a pair of solenoids oppositely inclined to each other, means substantially as described for alternately energizing them, a switch-arm adapted to close and break the primary and secondary circuits, with a curved armature attached to its free end and coacting with said solenoids, a pair of solenoid-switches and a connection between them adapted to throw one open when the other is closed, and a projection on said switch-arm adapted to engage said solenoid-switches alternately when near the limit of its stroke, substantially as and for the purpose set forth.

2. In an automatic cut-out, the combination of a pair of solenoids with means for alternately energizing them, substantially as described, a switch-arm pivoted to oscillate between them, and having a curved armature coacting therewith, and friction-springs adapted to engage with said arm at the limits of its stroke and prevent its rebound, substantially as described.

3. In an electrical cut-out, substantially as described, the combination of a pair of solenoids adapted to be alternately energized, an armatured switch-arm oscillating between them, a switch for each solenoid having a hinged switch-closer, a link connecting them, and a stud on the main switch-arm adapted to engage with each of said switch-closers alternately, substantially as and for the purpose set forth.

4. In an electrical cut-out having a switch-closer for the primary and secondary circuits, and a continuous source of electrical energy, substantially as described, of a controller having a solenoid in circuit with said source of energy, an oscillating armature coacting therewith, a spring adapted to withdraw said armature when the solenoid is deënergized, switches adapted to be alternately closed by the movement of said armature, a switch-closer connected with the armature, and a switch-releaser adapted to liberate each switch alternately after the armature has closed the switch and before making the return stroke.

5. The combination with a controller substantially as described, a switch-closer for the primary and secondary circuits, a releaser for the controller-switches, and a connection thereof with the said primary and secondary switch-closer, substantially as and for the purpose set forth.

6. In a controller for electrical cut-outs, substantially as described, the combination of an oscillating arm, a switch-closer attached thereto, a pair of switches adapted to be alternately closed thereby, having divergent contact-plates, a pair of wedges adapted to spread said plates, and a connection thereof with a reciprocating bar, substantially as and for the purpose set forth.

7. The combination in a controller for an electrical cut-out, of an oscillating switch-closer, a pair of switches adapted to be alternately closed thereby, a pair of pivotal wedge-bars engaging with said switches and adapted to release them, and a reciprocating bar engaging with said wedges when near the limit of its stroke, substantially as and for the purpose set forth.

8. In a controller for electrical cut-outs, the combination of an oscillating switch-closer, of a spring connecting therewith and at its other end with a shifter, the stress of said spring being neutral when the arm is at its extreme positions but operative as soon as the arm begins to move therefrom, and a shifter adapted to shift said spring alternately to said neutral positions, substantially as and for the purpose set forth.

9. In an electrical cut-out, the combination of two oscillating switch-closers, one of them adapted to alternately close two controller-switches, and the other to close the primary and secondary circuits by a movement in one direction and to open them by the contrary movement, a spring connected at one end to the controller-switch closer and at the other to a shifter adapted to transfer the stress of said spring to a neutral position at the termini of its stroke, and a connection of said shifter with the other switch-closer, substantially as and for the purpose set forth.

10. In an automatic cut-out for electrical converters, the combination with a three-wire system of distribution, of a controller having a plurality of solenoids in seperate electrical connection with active wires of said system, respectively, and electrically connected with a continuous source of electrical energy, a switch-closer adapted to open and close the primary and secondary circuits, a plurality of switches for said secondary circuit, solenoids adapted to oscillate said primary and secondary switch-closer, and a separate electrical connection of the controller-solenoids with said secondary switches, substantially as and for the purpose set forth.

In testimony whereof I affix my signature in presence of two witnesses.

WILLIAM J. GREENE.

Witnesses:
J. F. GROAT,
J. M. ST. JOHN.